United States Patent [19]

Summers

[11] 3,993,229

[45] Nov. 23, 1976

[54] PIVOTABLE BUMPER FOR CARRYING MOTORCYCLES

[76] Inventor: Thomas Wade Summers, 9703 Michael Edward Drive, Fern Creek, Ky. 40291

[22] Filed: Jan. 29, 1975

[21] Appl. No.: 545,007

[52] U.S. Cl. .................. 224/42.03 B; 224/42.08; 224/42.44; 293/73
[51] Int. Cl.² ........................................ B60R 11/00
[58] Field of Search .......... 224/42.01, 42.05, 42.04, 224/42.03 B, 42.03 R, 42.44, 29 R; 293/73, 69; 214/450, 505, 77 P

[56] References Cited
UNITED STATES PATENTS

| | | |
|---|---|---|
| 1,527,184 | 2/1925 | Grotenhuis ........................ 293/73 |
| 1,551,755 | 9/1925 | Larson ............................. 293/73 |
| 2,179,163 | 11/1939 | Roth ............................... 293/73 |
| 3,282,368 | 11/1966 | Pittera ............................ 293/73 |
| 3,567,052 | 3/1971 | Allen .............................. 214/450 |

FOREIGN PATENTS OR APPLICATIONS

| | | |
|---|---|---|
| 236,748 | 7/1925 | United Kingdom ................ 293/73 |

Primary Examiner—Robert J. Spar
Assistant Examiner—Jerold M. Forsberg
Attorney, Agent, or Firm—Martin R. Levy

[57] ABSTRACT

A vehicle bumper pivotably attached to a motor vehicle capable of being used to support a motorcycle. While in the bumper position, the support serves to cushion the vehicle upon collisions; however, upon pivoting to the carrier position it can be used to support a motorcycle for transportation.

5 Claims, 4 Drawing Figures

U.S. Patent  Nov. 23, 1976  3,993,229
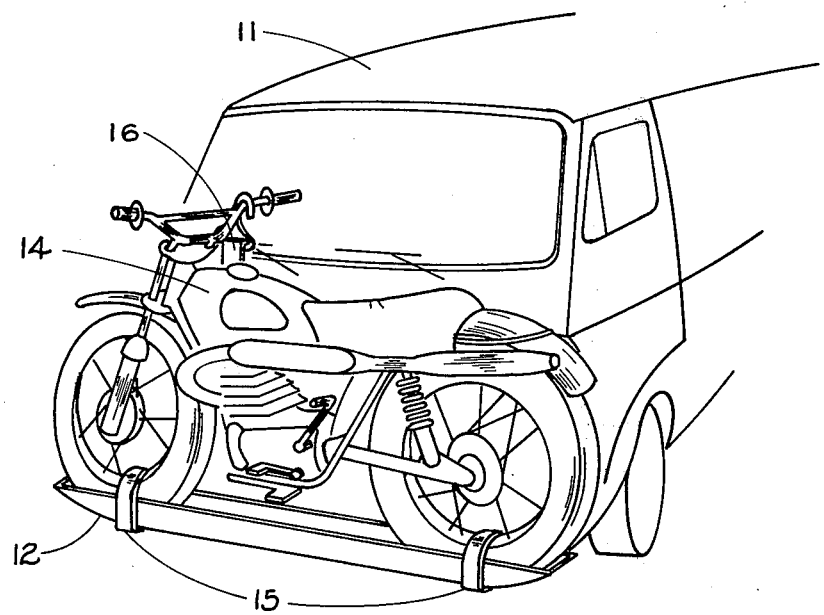
Fig. 1
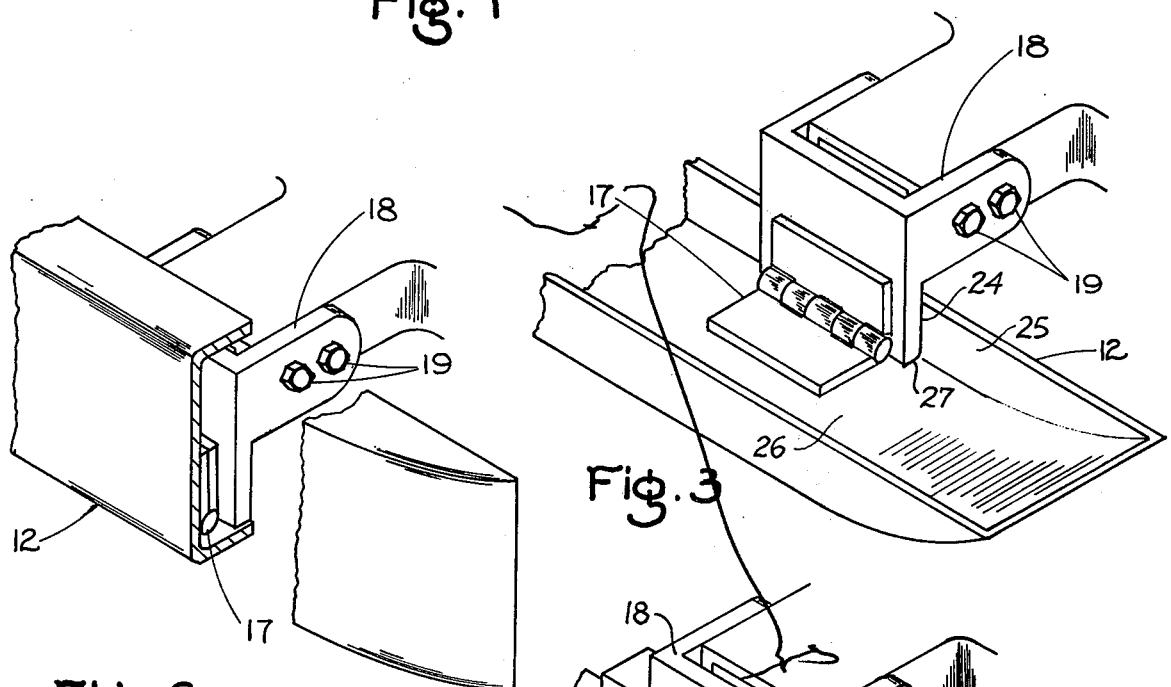
Fig. 2
Fig. 3
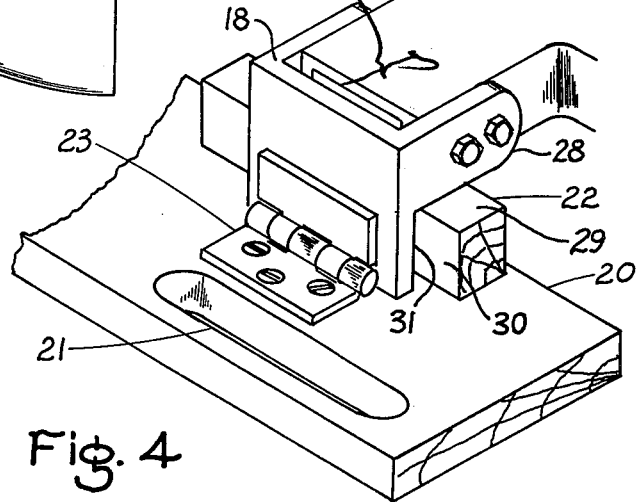
Fig. 4

PIVOTABLE BUMPER FOR CARRYING MOTORCYCLES

BACKGROUND OF THE INVENTION

Owners of motorcycles wishing to transport the vehicles from place to place, rather than riding them, have various alternatives available to them. Trailers, for example, may be used to carry up to three motorcycles. Another common means is to use a van-type or pick-up truck. Other alternatives, but less common, are the use of attachments to or replacement of the bumper by a carrier device. None of the above listed means for transporting motorcycles is totally acceptable. Trailers are expensive, sometimes costing as much as the motorcycle to be carried. When not in use, trailers must be stored, are difficult to back up and park, and also require other expenses in the maintenance, spare tires, license and tolls. The hoop-type carriers that attach to the bumper must be put on prior to use and be removed after use, or, if kept in place, are unsightly and run the risk of being ruined by even the slightest bumper to bumper collision. The hoop-type carriers are also restricted to the size of motorcycles that can be carried. Replacement of the bumper with a channel carrier common to some trailers likewise offers an unsightly appearance and is susceptible to destruction by moderate impact, as in a minor collision. Vans and pick-up trucks probably offer the most acceptable means to date for transporting a motorcycle. However, their initial cost, if solely for the purpose of transporting a motorcycle, is certainly unreasonable. Another problem of transporting a motorcycle inside a vehicle, such as a van or a pick-up truck, results when the motorcycle is dirty, muddy or leaks gasoline or lubricants. Deposits of mud, dirt, gasoline or oil on the floor and sides of the transporting vehicle is certainly undesirable. The present invention suffers from none of the above disadvantages. The invention is inexpensive and does not interfere with parking or backing up of the vehicle of which it is an integral part. The invention, while being an integral part of the vehicle, is rugged and functions as the bumper. The invention can be positioned in either one of two modes, i.e., a bumper mode or a carrier mode, by simply pivoting the bumper. While in the bumper mode, it is not readily discernible from a conventionally equipped vehicle of similar make and model.

SUMMARY OF THE INVENTION

The invention is a vehicle bumper which can be positioned in two modes. One mode serves a normal bumper function, while the second mode serves the carrier function. The bumper is pivotably attached to a brace or support in such a way that the pivoting action is constrained in either the bumper mode or the carrier mode.

DESCRIPTION OF THE DRAWINGS

FIG. 1 shows a fragmentary perspective view showing a van equipped with the invention and a motorcycle supported and secured for transportation.

FIG. 2 is a fragmentary perspective view showing the brace, pivoting means and a U-shaped channel positioned in a bumper mode.

FIG. 3 is a fragmentary perspective view showing the brace pivoting means and a U-shaped channel in the carrier mode.

FIG. 4 is a perspective view showing a substantially planar bumper member having cut-away portions for engaging the wheels of the motorcycle.

DETAILED DESCRIPTION OF THE PREFERRED EMBODIMENT

Referring to the drawings, FIG. 1 depicts a vehicle 11 which for purposes of illustration is a vehicle commonly known as a Van 11 having a channel member or other substantially U-shaped member 12 positioned in the carrier mode. Wheels 13 of motorcycle 14 are held in U-shaped member 12 by straps 15. Tie downs 16 firmly hold motorcycle 14 in place.

FIG. 2 shows U-shaped member 12 pivotably attached to a hinge 17 to brace 18 which provides a surface for Hinge 17 is aligned so as to allow rotation of member 12 outwardly, transverse to the length of Van 11 and coplanar with the horizontal. However, in the bumper mode as shown in FIG. 2 brace 18 and hinge 12 are substantially concealed giving a conventional and pleasing appearance to vehicle 11 so as to be rigidly fixed to the frame members of van 11 via bolts 19. As seen in FIG. 3, brace 18 also provides a surface 24 and a surface 27 for abutting member 12 in the carrier mode. Member 12 provides surfaces 25 and 26 for abutting brace 18, thereby limiting rotation about hinge 17 to substantially 90°. Hinge 17 is shown in these figures to be a separate component, however, the pivotable means could be an integral part of members 12 and brace 18 without detraction from the scope of this invention.

FIG. 4 illustrates another embodiment of the present invention by depicting a bumper member 20 which serves the same dual function of providing a bumper mode and, after rotation, a carrier mode. Slot 21 engages with motorcycle wheels 13. Surfaces 29 and 30 of Block 22 abut surfaces 28 and 31 of brace 18 thereby limiting rotation about hinge 23 to substantially 90°.

Abutting surfaces 26 and 27 of FIG. 3 and surfaces 28 and 29 of FIG. 4 undergo a compression moment when in the carrier mode. Abutting surfaces 24 and 25 of FIG. 3 and surfaces 30 and 31 of FIG. 4 undergo a bending moment when in the carrier mode. These two force moments, resulting from the weight of the motorcycle, provide a more even distribution of forces on brace 18.

By the preceding drawings and descriptions it is understood that variations in construction and assembly are possible without detracting from the scope of the invention in which I claim:

1. An improved motorcycle carrier in combination with a vehicle, said improvement comprising: a) at least one brace means secured to a frame member of said vehicle, b) a bumper means pivotably secured to said brace means by at least one hinge for movement between a bumper mode and a carrier mode, said bumper rotatable transverse to the longitudinal direction of the vehicle, said bumper means in the bumper mode presenting a substantially vertical surface adapted to protect said vehicle from collisions and in said carrier mode presenting a substantially horizontal surface at least partially recessed for receiving and supporting a motorcycle, said bumper means having at least one abutting surface with said brace means in the carrier mode at substantially 90° rotation to the bumper mode, whereby when said bumper is in the horizontal position the wheels of a motorcycle may be partially received therein for transportation of said motorcycle.

2. The combination of claim 1 which in cross section the bumper means is substantially U-shaped.

3. The combination of claim 1 which is substantially planar and has oval shaped openings therein for engaging the wheels of the motorcycle.

4. The combination of claim 1 in which said bumper means and said brace means provide surface means for abutting and distributing forces into a compression moment and a bending moment when a motorcycle is supported by said bumper.

5. The combination of claim 1 in which said brace means and pivotable means are substantially concealed by said bumper means when in the bumper mode.

* * * * *

UNITED STATES PATENT OFFICE
CERTIFICATE OF CORRECTION

Patent No. 3,993,229          Dated November 23, 1976

Inventor(s) Thomas Wade Summers

It is certified that error appears in the above-identified patent and that said Letters Patent are hereby corrected as shown below:

The jagged line connecting Figures 3 and 4 should be deleted.

Signed and Sealed this

Fifteenth Day of March 1977

[SEAL]

Attest:

RUTH C. MASON
*Attesting Officer*

C. MARSHALL DANN
*Commissioner of Patents and Trademarks*